(12) United States Patent
Li et al.

(10) Patent No.: US 11,448,913 B2
(45) Date of Patent: Sep. 20, 2022

(54) DISPLAY DEVICE AND FABRICATION METHOD THEREOF

(71) Applicants: K-TRONICS (SUZHOU) TECHNOLOGY CO., LTD., Jiangsu (CN); BOE TECHNOLOGY GROUP CO., LTD., Beijing (CN)

(72) Inventors: Zhongcheng Li, Beijing (CN); Xiuhe Zhou, Beijing (CN); Zhaoxi Yu, Beijing (CN); Jie Wang, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 370 days.

(21) Appl. No.: 16/818,808

(22) Filed: Mar. 13, 2020

(65) Prior Publication Data
US 2021/0149239 A1 May 20, 2021

(30) Foreign Application Priority Data
Nov. 18, 2019 (CN) .......................... 201921997450.7

(51) Int. Cl.
*G02F 1/1333* (2006.01)
*G06F 1/16* (2006.01)

(52) U.S. Cl.
CPC .. *G02F 1/133308* (2013.01); *G02F 1/133331* (2021.01); *G06F 1/1607* (2013.01); *G02F 1/133317* (2021.01); *G02F 1/133325* (2021.01); *G02F 2202/22* (2013.01); *G02F 2202/28* (2013.01)

(58) Field of Classification Search
CPC ......... G02F 1/133308; G02F 1/133325; G02F 1/133331; G02F 2202/22; G02F 2202/28; G02F 1/133317; G06F 1/1607
See application file for complete search history.

(56) References Cited

U.S. PATENT DOCUMENTS

| | | | | |
|---|---|---|---|---|
| 8,755,001 B2* | 6/2014 | Harada | ................. | G02F 1/1333 349/122 |
| 9,519,177 B2* | 12/2016 | Moro | .................... | G02F 1/1339 |
| 9,977,468 B2* | 5/2018 | Kim | ........................ | G02F 1/133 |
| 2008/0153377 A1* | 6/2008 | Kobayashi | ........ | G02F 1/133308 445/24 |
| 2009/0086123 A1* | 4/2009 | Tsuji | ................. | G02F 1/133308 349/58 |
| 2009/0215351 A1* | 8/2009 | Kobayashi | ........ | G02F 1/133308 445/24 |
| 2011/0177261 A1* | 7/2011 | Ishii | ................. | G02F 1/133308 156/273.5 |
| 2011/0187960 A1* | 8/2011 | Kobayashi | ................ | H01J 9/20 445/25 |

* cited by examiner

*Primary Examiner* — Nidhi Thaker

(57) ABSTRACT

A display device and a fabrication method thereof are disclosed. A display device, including: a display panel and a cover plate provided opposite to each other; and a support layer, provided between the display panel and the cover plate, the support layer being configured to support the display panel and the cover plate, so that a gap is provided between the display panel and cover plate; the support layer comprising a plurality of first support portions; and the plurality of first support portions are dispersedly arranged and spaced apart from each other.

11 Claims, 4 Drawing Sheets

DISPLAY DEVICE AND FABRICATION METHOD THEREOF

CROSS-REFERENCE TO RELATED APPLICATIONS

The present application claims priority to Chinese Patent Application No. 201921997450.7 entitled "Display Device" filed on Nov. 18, 2019. For all purposes under the U.S. law, the disclosure of which is incorporated herein by reference in its entirety as part of the present application.

TECHNICAL FIELD

Embodiments of the present disclosure relate to a display device and a fabrication method thereof.

BACKGROUND

With rapid development of display technologies, users demand higher and higher requirements for appearance and picture quality of display products. In some large-sized commercial display screens, a gap between a glass cover plate and a liquid crystal display panel is relatively large; in this regard, the reinforced glass cover plate and the liquid crystal display panel may be bonded into a fully-laminated component by using a full lamination technology, so as to reduce the gap therebetween.

SUMMARY

Embodiments of the present disclosure relate to a display device and a fabrication method thereof.

According to first aspect of the present disclosure, it is provided a display device, comprising:

a display panel and a cover plate provided opposite to each other; and a support layer, provided between the display panel and the cover plate, the support layer being configured to support the display panel and the cover plate, so that a gap is provided between the display panel and cover plate; the support layer comprising a plurality of first support portions; and the plurality of first support portions are dispersedly arranged and spaced apart from each other.

According to first aspect of the present disclosure, it is provided fabrication method of a display device, comprising:

providing a display panel and a cover plate;

forming a plurality of first support portions on a surface of the display panel that is to face towards the cover plate or an opposed surface of the cover plate that is to face towards the display panel, the plurality of first support portions being dispersedly arranged and spaced from each other; and bonding the surface of the display panel with the opposed surface of the cover plate, wherein the plurality of first support portions support the display panel and the cover plate, so that a gap is formed between the display panel and the cover plate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
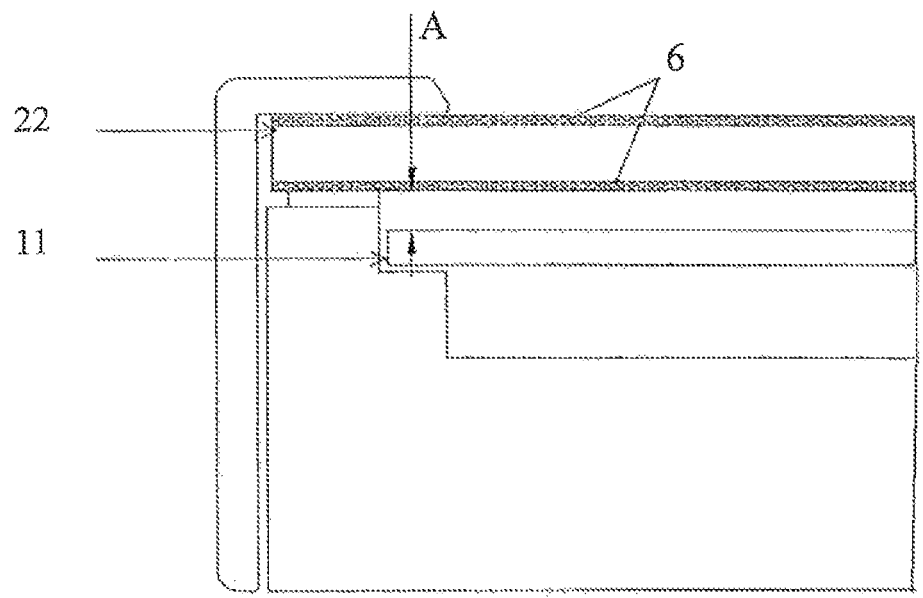
FIG. 1 is a structural schematic diagram of a cross section of a display device according to the present disclosure.
Figure 2:
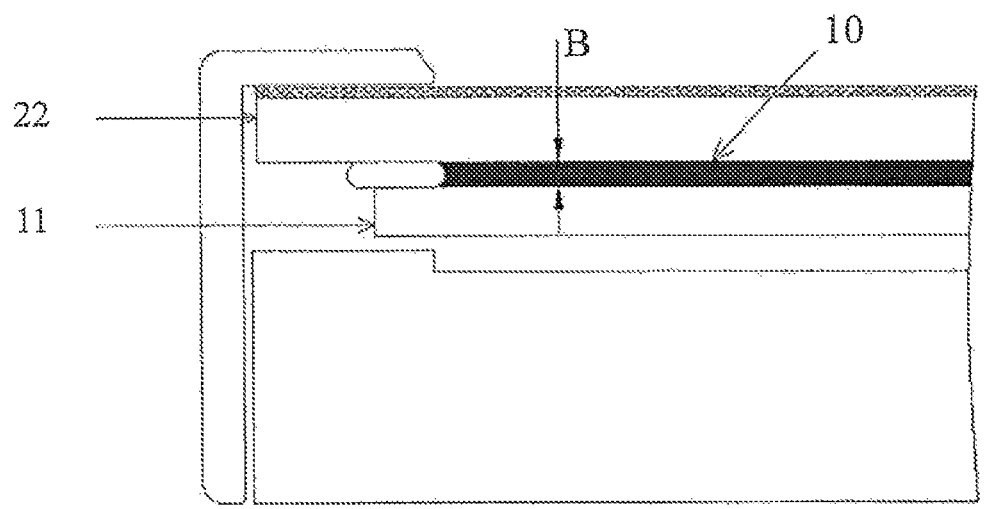
FIG. 2 is a structural schematic diagram of a cross section of a display device produced by using a full lamination technology according to the present disclosure.

FIG. 1 is a structural schematic diagram of a cross section of a large-sized liquid crystal display device. As shown in FIG. 1, a separation distance A between a display panel 11 and a cover plate 22 ranges from 4 mm to 5 mm, and the product is relatively thick with a more serious ghost, which affects picture quality. In addition, the cover plate 22 (generally made of reinforced glass) needs to be subjected to a double-sided haze (AG) treatment so as to solve a color halo problem. In order to solve the above-described problems of the large-sized liquid crystal display device of FIG. 1, FIG. 2 is a large-sized liquid crystal display device fabricated by using a full lamination technology, the reinforced glass cover plate 22 is subjected to a single-sided haze treatment, full laminating glue (i.e., a glue layer 10) is filled between the display panel 11 and the tempered glass cover plate 22, and a separation distance B therebetween is reduced. However, the full lamination technology has a complicated fabrication process, a high defect rate and poor reworkability, resulting in a higher product cost, and is inapplicable to mass-production.

The embodiments of the present disclosure provide a display device and a fabrication method thereof, which can reduce a production cost and increase a yield without any color halo or ghost.

An embodiment of the present disclosure provides a display device, comprising: a display panel and a cover plate provided opposite to each other; and a support layer, provided between the display panel and the cover plate, wherein, the support layer is configured to support the display panel and the cover plate, so that there is a gap therebetween; the support layer includes a plurality of first support portions; and the plurality of first support portions are dispersedly arranged and spaced apart from each other.

In the display device according to the above-described embodiment, by providing the plurality of first support portions spaced apart from each other between the display panel and the cover plate, a production cost of the display device can be reduced, and a separation distance between the display panel and the cover plate can be further reduced, so as to avoid a ghost or color halo phenomenon.

As shown in FIG. 3 to FIG. 7, an embodiment of the present disclosure provides a display device, comprising a display panel 1 and a cover plate 2 provided opposite to each other; a support layer 3 is provided between the display panel 1 and the cover plate 2; the support layer 3 is configured to support the display panel 1 and the cover plate 2, so that there is a preset separation distance therebetween; the support layer 3 includes a plurality of first support portions 4; and the plurality of first support portions 4 are dispersedly arranged and spaced apart from each other.

In the display device according to the embodiment of the present disclosure, by providing the support layer 3 between the display panel 1 and the cover plate 2, a preset separation distance therebetween can be ensured. The support layer 3 can prevent a color halo problem caused by absorption generated by an excessively small separation distance between the display panel 1 and the cover plate 2, and can avoid a ghost problem caused by a relatively large separation distance that is set to prevent absorption between the display panel 1 and the cover plate 2. The support layer 3 includes a plurality of first support portions 4 dispersedly arranged, which can not only achieve an effect of a full lamination process, but also greatly reduce a product cost (the cost thereof is only about one tenth the cost of full lamination technology). In addition, the display device is thinner and can display image without any halo or ghost, and has a high product yield. For example, in at least one example, the support layer 3 may be formed by using a screen-printing process or a nano-imprinting process.

Figure 3:
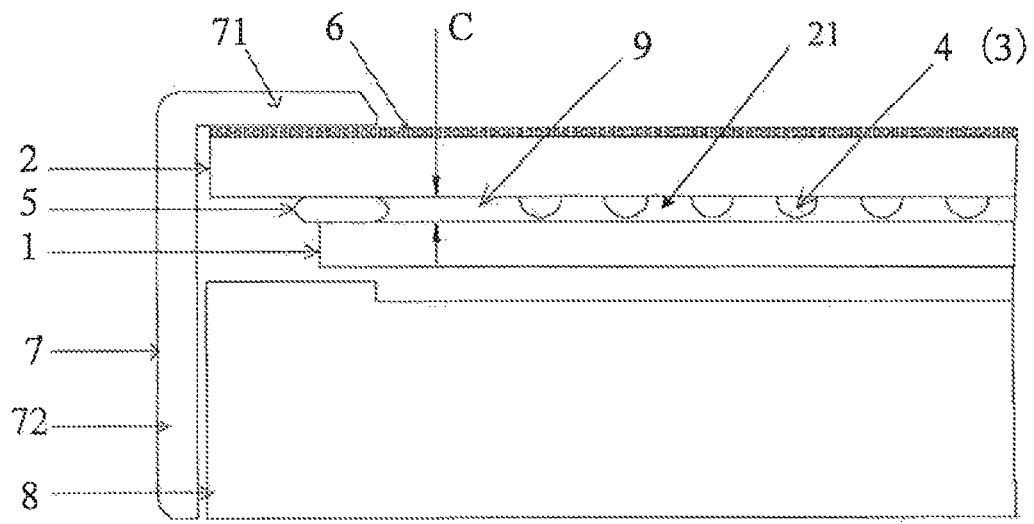
FIG. 3 is a structural schematic diagram of a cross section of a display device according to an embodiment of the present disclosure.
Figure 4:
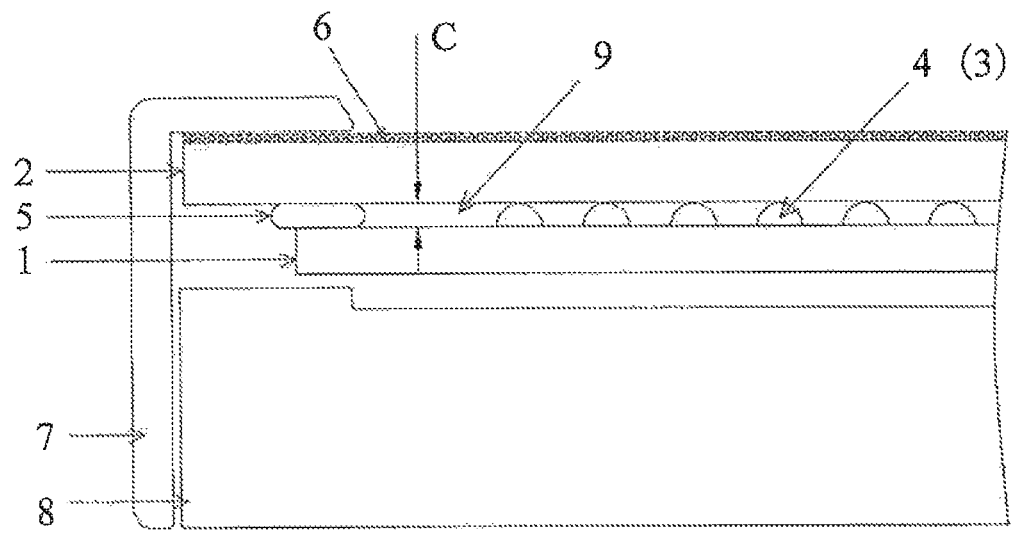
FIG. 4 is a structural schematic diagram of a cross section of a display device according to another embodiment of the present disclosure.

In this embodiment, the support layer 3 may be provided on the display panel 1, or may also be provided on the cover plate 2. As shown in FIG. 4, the support layer 3 is provided on a surface of the display panel 1 that faces towards the cover plate 2. In another embodiment, as shown in FIG. 3, the support layer 3 is provided on the surface of the cover plate 2 that faces towards the display panel 1. In other embodiments, the support layer 3 may be provided on counter surfaces of both the display panel 1 and the cover plate 2.

For example, as shown in FIG. 3 and FIG. 4, an air gap is formed between every adjacent two of the first support portions 4, so that the first support portion is in contact with neither the display panel 1 nor the cover plate 2 at the air gap. In this way, as compared with the full lamination technology, a material consumption amount of the first support portion 4 is relatively small, which can reduce a fabrication cost of the display device.

Figure 5:
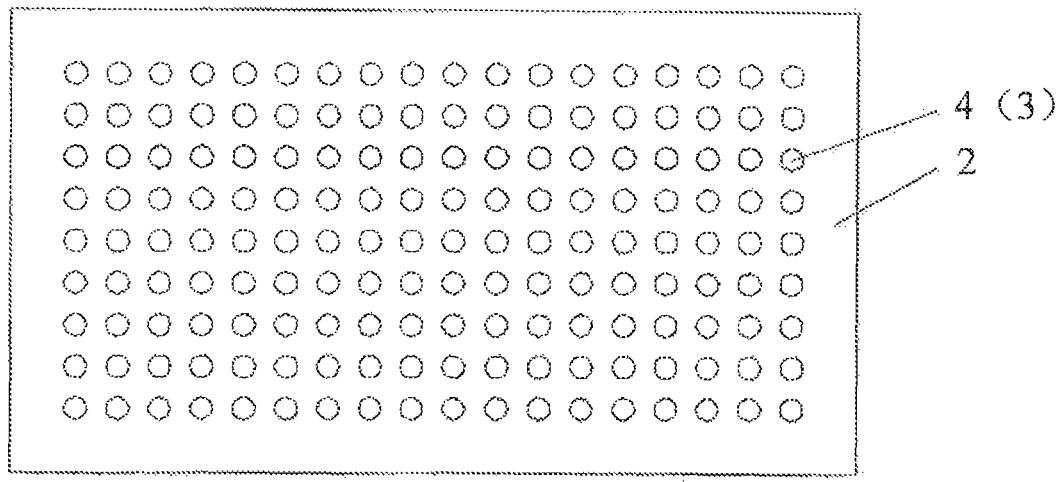
FIG. 5 is a structural schematic diagram of distribution of first support portions according to an embodiment of the present disclosure.
Figure 6:
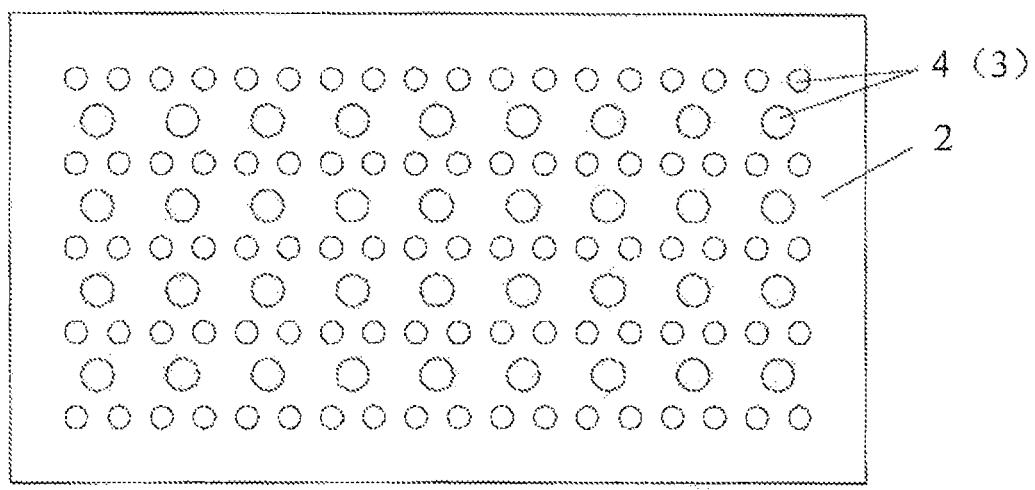
FIG. 6 is a structural schematic diagram of distribution of first support portions according to another embodiment of the present disclosure.
Figure 7:
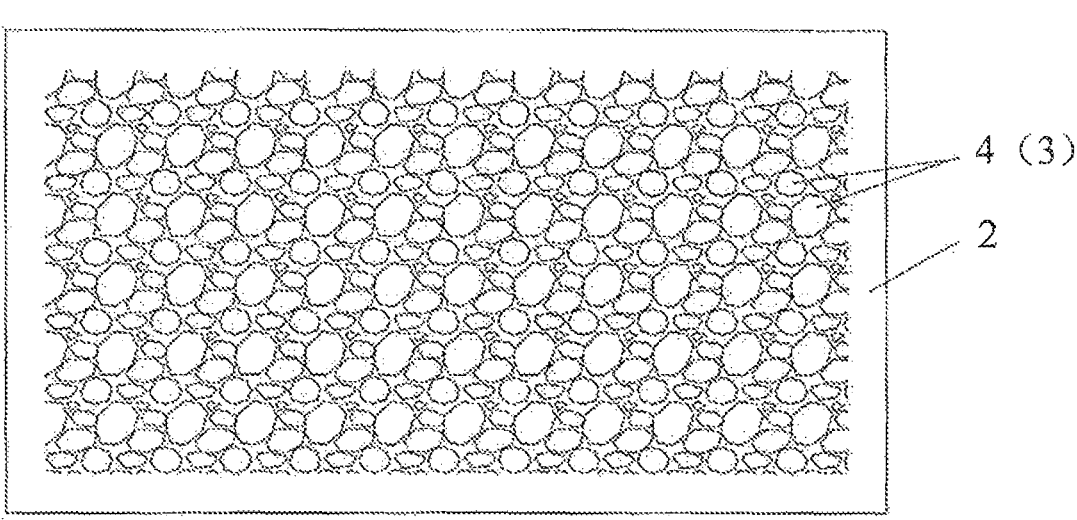
FIG. 7 is a structural schematic diagram of distribution of first support portions according to still another embodiment of the present disclosure.

For example, FIG. 5, FIG. 6 and FIG. 7 respectively show distribution diagrams of three examples of the first support portions 4. As shown in FIG. 5 to FIG. 7, the plurality of first support portions 4 are distributed in a dot matrix on the surface of the cover plate 2 that faces towards the display panel 1 or the surface of the display panel 1 that faces towards the cover plate 2; the plurality of first support portions 4 are dispersedly arranged; and an air gap is formed between first support portions 4. The first support portion 4 plays a supporting role, to prevent a color halo caused by absorption generated by the display panel 1 and the cover plate 2.

In the embodiment of the present disclosure, a shape of a first support portion 4 will not be limited, and may be a hemisphere, a semi-ellipsoid or a cylinder, etc. The first support portions 4 may have sizes the same or different from each other, and may be arranged regularly or irregularly. For example, as shown in FIG. 5, all the first support portions 4 are arranged in an array. In a row direction and/or a column direction, separation distances between the plurality of first support portions may be the same or different from each other. In at least one example, in the row direction and/or the column direction, the plurality of first support portions are arranged at equal intervals, which can simplify a fabrication process and reduce a fabrication difficulty.

For example, the plurality of first support portions include a plurality of first supporters and a plurality of second supporters; the first supporters and the second supporters are alternately arranged in the row direction or the column direction; and volumes of the first supporters and the second supporters are different from each other, which, thus, can meet different requirements for lamination degrees of different regions in the large-sized display device. For example, with respect to a region that requires a higher lamination degree, a supporter with a larger volume is formed; and with respect to a region that requires a lower lamination degree, a supporter with a smaller volume is formed. In at least one example, an area of an orthographic projection of a first supporter on the display panel is larger than an area of an orthographic projection of a second supporter on the display panel. For example, as shown in FIG. 6, a shape of an orthographic projection of a first support portion 4 on the display panel is a circle; some of the first support portions 4 have a larger diameter, and the other first support portions 4 have a smaller diameter; the first support portions 4 with two diameter sizes are alternately arranged in rows. For another example, the first supporters and the second supporters with different sizes may be alternately arranged in a same row or a same column.

For example, as shown in FIG. 7, the first support portions 4 have various diameter sizes, and the plurality of first support portions 4 of different sizes are arranged at intervals, which, thus, can also reduce a fabrication cost of the display device according to the present disclosure.

In the embodiment of the present disclosure, in the gap between the display panel 1 and the cover plate 2, an air gap 21 is formed between the plurality of first support portions 4, as shown in FIG. 3. In this way, the support layer 3 does not have to overlay the entire surface of the display panel 1 that faces towards the cover plate 2 or the entire surface of the cover plate 2 that faces towards the display panel 1. As compared with the full lamination technology, the above-described fabrication process of the display device is simple with a low production cost, and has a thickness of the support layer 3 easily controlled, which increases a product yield.

As shown in FIG. 3 and FIG. 4, in this embodiment, the support layer 3 may be formed on the surface of the display panel 1 or the surface of the cover plate 2 by using the screen-printing process or the nano-imprinting process. A separation distance C between the display panel 1 and the cover plate 2 may be fabricated up to 0.8 mm to 1.0 mm, which can not only achieve the effect of the full lamination process, but also greatly reduce the product cost. In addition, the display device is thinner, can display image without any color halo or ghost, and has a high product yield.

For example, the thickness of the support layer 3 may be 0.3 mm to 0.8 mm, and the thickness of the support layer 3 refers to a thickness of the support layer in a direction perpendicular to the display panel 1 or the cover plate 2. For example, the size of the first support portion 4 may be 0.3 mm to 0.5 mm, and the size refers to a size in a direction parallel to the display panel 1 or the cover plate 2.

Figure 8:
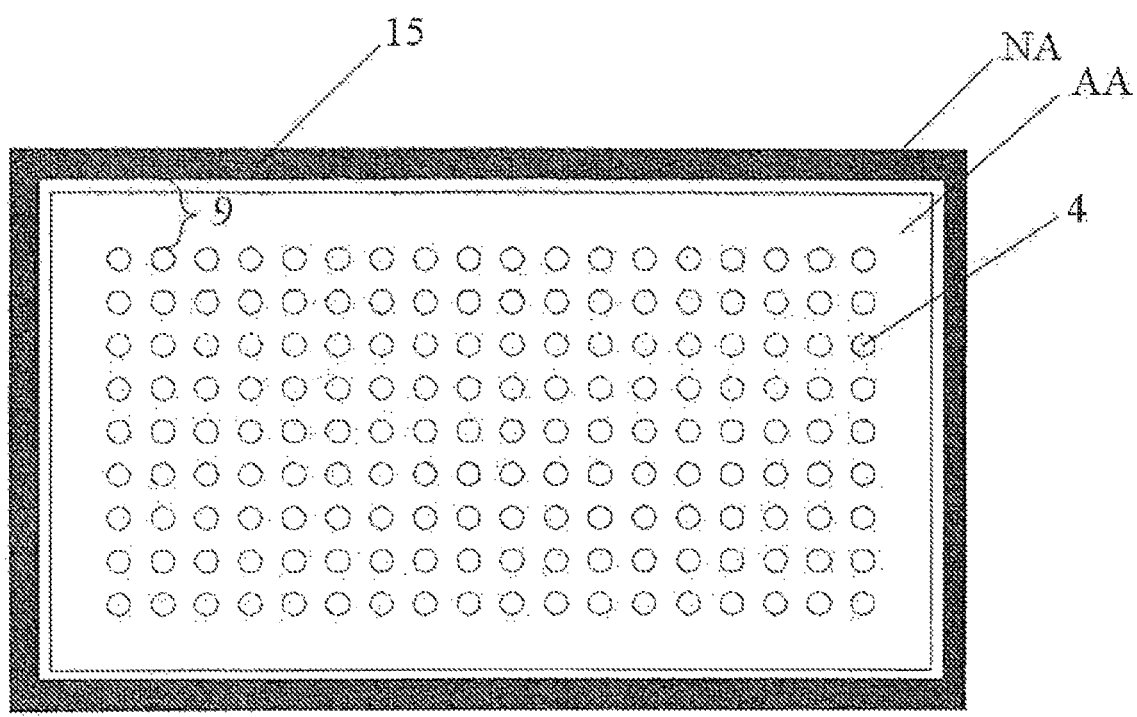
FIG. 8 is a top view of a display panel according to an embodiment of the present disclosure.

For example, as shown in FIG. 8, the display panel includes a display region AA for image display and a non-display region NA surrounding the display region. The plurality of first support portions 4 may be located only in the display region AA, or may also be located in the display region AA and the non-display region NA. In at least one example, as shown in FIG. 8, orthographic projections of the plurality of first support portions 4 on the display panel are located in the display region AA.

For example, the support layer 3 may be made of a transparent elastic material, such as polyethylene terephthalate (PET) and thermoplastic vulcanizate (TPV), so that transparent display is not affected, and the elastic material does not easily damage the display panel 1 or the cover plate 2. For example, the support layer 3 may contain an antistatic material, the antistatic material may be added to the material for forming the support layer 3, and then the support layer 3 is fabricated. The antistatic material in the support layer 3 can prevent a color halo caused by electrostatic absorption generated by the display panel 1 and the cover plate 2.

For example, as shown in FIG. 8, the support layer further includes a second support portion 15 located in the non-display region NA. In at least one example, an orthographic projection of the second support portion 15 on the display panel is located in the non-display region NA of the display device; and an air gap 9 is formed between the second support portion 15 and a portion of the first support portion 4 that is close to the non-display region NA.

For example, the second support portion includes curable adhesive, and the curable adhesive is located at peripheral edges of the display panel and the cover plate. For example, as shown in FIG. 3 and FIG. 4, the peripheral edges of both the display panel 1 and the cover plate 2 may be connected with each other by fixing adhesive 5 or double-sided adhesive, so that the display panel 1 and the cover plate 2 can be bonded together in a laminated manner. The fixing adhesive 5 or the double-sided adhesive may be set in a black silkscreen region of the peripheral edge of the cover plate 2, that is, the non-display region in the periphery of the display region. For example, the fixing adhesive 5 may be elastic adhesive. For example, the double-sided adhesive may be residue-free removable double-sided adhesive. For example, a thickness of the fixing adhesive 5 or the double-sided adhesive may be 0.8 mm to 1.0 mm, so that the separation distance between the display panel 1 and the cover plate 2 remains unchanged.

For example, as shown in FIG. 3 and FIG. 4, a surface of the cover plate 2 that is away from the display panel 1 may be a matte surface 6, that is, the surface thereof is made to have a certain haze effect. The outer surface of the cover plate 2 is set as the matte surface 6, which can play an anti-glare and anti-reflective role. The surface of the display panel 1 that faces towards the cover plate 2 may also be subjected to a haze treatment so as to be a matte surface. For example, the matte surface may be set to have a high haze of 20% to 30%, so as to further increase an anti-halo effect.

The display device according to this embodiment may be applied to various types of display devices, such as a liquid crystal display device and an Organic Light Emitting Diode (OLED) display device. For example, when the display panel 1 is a liquid crystal display panel, the liquid crystal display panel includes an array substrate, a color filter substrate, and a liquid crystal layer provided therebetween. For example, the cover plate is provided on a side of the color filter substrate that is opposite to the liquid crystal layer. Further, in at least one example, the liquid crystal display panel further includes an upper polarizer provided between the color filter substrate and the cover plate, and a lower polarizer on a side of the array substrate that is opposite to the liquid crystal layer. Therefore, a surface of the liquid crystal display panel that faces towards the cover plate 2 is an upper surface (i.e., an outer surface) of the upper polarizer.

For example, as shown in FIG. 3, taking a liquid crystal display device as an example, the display device according to this embodiment further comprises a backlight module 8 provided on a side of the display panel 1 that is away from the cover plate 2, and a surface frame 7 enclosing the periphery of the cover plate 2 and the backlight module 8; the surface frame 7 is provided with a first fixed portion 71 that is fixed to a peripheral position of a surface (i.e., the outer surface) of the cover plate 2 that is away from the display panel 1; and the surface frame 7 is further provided with a second fixed portion 72 that is fixed to the backlight module 8.

For example, the surface frame 7 includes a rectangular frame body with a certain thickness; an inner side of one end of the frame body is provided with an extension portion parallel to the cover plate 2, and the extension portion forms the first fixed portion 71. The first fixed portion 71 may be fixed to the peripheral position of the outer surface of the cover plate 2 by double-sided adhesive, or the cover plate 2 may be pressed and fastened onto the first fixed portion 71 by a buckle provided on the surface frame 7. The other end of the frame body may be fixed onto the backlight module 8 by a fastener such as a screw.

An embodiment of the present disclosure further provides a fabrication method of a display device. The fabrication method comprises:

Providing a display panel and a cover plate;

Forming a plurality of first support portions on a surface of the display panel that is to face towards the cover plate or an opposed surface of the cover plate that is to faces towards the display panel, the plurality of first support portions being dispersedly arranged and spaced from each other; and Bonding the surface of the display panel and the opposed surface of the cover plate, wherein, the plurality of first support portions support the display panel and the cover plate, so that there is a gap between the display panel and the cover plate.

In the fabrication method of the display device according to the above described embodiment, by forming the plurality of first support portions spaced apart from each other between the display panel and the cover plate, a production cost of the display device can be reduced, and a separation distance between the display panel and the cover plate can be further reduced, so as to avoid occurrence of a ghost or color halo phenomenon.

For example, before the bonding the surface of the display panel and the opposed surface of the cover plate, the fabrication method further comprises: forming a second support portion on the surface of the display panel that is to face towards the cover plate or the opposed surface of the cover plate that is to face towards the display panel.

For example, the second support portion is continuously coated, so that an enclosed cavity is formed between the second support portion, the display panel and the cover plate, and the plurality of first support portions are located in the enclosed cavity. For example, a curable material is continuously coated in an edge region of a same surface on which the plurality of first support portions are formed, to form the second support portion. Description in the foregoing embodiments may be referred to for arrangement modes and specific materials of the second support portion and the first support portion, and no details will be repeated here.

For example, the plurality of first support portions are formed by using a screen-printing method or a nano-imprinting method, which can reduce a fabrication difficulty and cost.

Hereinafter, the fabrication method of the display device will be described through a specific example.

As shown in FIG. 3 to FIG. 7, the fabrication method of the display device according to the embodiment of the present disclosure may comprise steps of:

S1: fabricating the support layer 3 (i.e., the plurality of first support portions 4) on the surface of the cover plate (reinforced glass cover plate) 2 or on the surface of the display panel 1 by using the screen-printing method or the nano-imprinting method. For example, an antistatic agent may be added to ink for forming the support layer 3, to prevent a color halo caused by electrostatic absorption. For example, the display panel 1 may be a liquid crystal display panel, and the support layer 3 may be formed on the upper surface of the upper polarizer of the liquid crystal display panel.

S2: applying fixing adhesive 5 on the peripheral edges of the cover plate 2 on which the support layer 3 is formed, and pre-curing the same; alternatively, attaching residue-free removable double-sided adhesive on the peripheral edges of the reinforced glass cover plate 2 on which the support layer 3 is formed.

S3: placing the cover plate 2 having step S2 completed in a limit fixture, and then bonding the display panel 1 to the cover plate 2 through the limit fixture, to obtain an air-gap fully-laminated component, wherein, the laminated component has an air layer with a thickness (i.e., a distance C between the cover plate 2 and the display panel 1) ranging from 0.8 mm to 1.0 mm, and has a relatively low cost (about one tenth of the cost of traditional full lamination).

In the fabrication method according to the above-described embodiment, the support layer 3 includes the plurality of dispersedly arranged first support portions 4, which can not only achieve an effect of the full lamination process, but also greatly reduce the product cost (the cost thereof is only about one tenth of the cost of full lamination). In addition, the display device is thinner, can display image without any halo or ghost, and has a high product yield.

In the disclosure, the following should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. A display device, comprising: a display panel and a cover plate provided opposite to each other; and a support layer, provided between the display panel and the cover plate, the support layer being configured to support the display panel and the cover plate, so that a gap is provided between the display panel and cover plate; the support layer comprising a plurality of first support portions; and the plurality of first support portions are dispersedly arranged and spaced apart from each other, wherein the display panel comprises a display region configured for displaying image and a non-display region surrounding the display region; and orthographic projections of the plurality of first support portions on the display panel are located in the display region, and wherein the support layer further comprises a second support portion; an orthographic projection of the second support portion on the display panel is located in the non-display region of the display device; and an air gap is formed between the second support portion and a portion of the first support portion that is close to the non-display region.

2. The display device according to claim 1, wherein an air gap is formed between every adjacent two of the first support portions, and the first support portion is in contact with neither the display panel nor the cover plate at the air gap.

3. The display device according to claim 1, wherein the plurality of first support portions are arranged in an array, and the plurality of first support portions are arranged at equal intervals in a row direction or a column direction.

4. The display device according to claim 3, wherein the plurality of first support portions comprise a plurality of first supporters and a plurality of second supporters; each of the first supporters and each of the second supporters are alternately arranged in the row direction or the column direction; and an area of an orthographic projection of each of the first supporters on the display panel is larger than an area of an orthographic projection of each of the second supporters on the display panel.

5. The display device according to claim 1, wherein the second support portion is continuously coated in the non-display region of the display device, so that an enclosed cavity is formed between the second support portion, the display panel and the cover plate, and the plurality of first support portions are located in the enclosed cavity.

6. The display device according to claim 1, wherein the plurality of first support portions comprise a transparent elastic material, and the second support portion comprises curable adhesive.

7. The display device according to claim 1, wherein the transparent elastic material comprises an antistatic material.

8. The display device according to claim 1, wherein a thickness of the first support portion is from 0.3 mm to 0.8 mm, and a thickness of the second support portion is from 0.8 nm to 1.0 mm.

9. The display device according to claim 1, wherein the cover plate comprises reinforced glass; a surface of the reinforced glass that is away from the display panel is a matte surface; and a surface of the reinforced glass that is close to the display panel is a non-matte surface.

10. The display device according to claim 1, wherein a separation distance between the display panel and the cover plate is from 0.8 mm to 1.0 mm.

11. The display device according to claim 1, further comprising:
- a backlight module provided on a side of the display panel that is opposite to the cover plate; and
- a surface frame enclosing a periphery of the backlight module; the surface frame comprising a fixed portion, and the fixed portion being configured to fix a surface of the cover plate that is away from the display panel.

* * * * *